United States Patent [19]
Jamzadeh et al.

[11] Patent Number: 5,803,869
[45] Date of Patent: Sep. 8, 1998

[54] AUTOMATIC TRANSMISSION AUTO NEUTRAL CLUTCH CONTROLS WITH INTERMITTENT SLIP AND A METHOD OF CONTROL

[75] Inventors: Fereydoon Jamzadeh, Indianapolis; Goetz William Schaefer, Brownsburg, both of Ind.

[73] Assignee: General Motors Corporation, Detroit, Mich.

[21] Appl. No.: 819,404

[22] Filed: Mar. 17, 1997

[51] Int. Cl.⁶ .............................. F16H 59/38; B60K 41/22
[52] U.S. Cl. ........................... 477/168; 477/169; 477/174; 477/175
[58] Field of Search ...................... 477/166, 168, 477/169, 174, 175, 176, 62, 63

[56] References Cited

U.S. PATENT DOCUMENTS

| | | | |
|---|---|---|---|
| 5,086,894 | 2/1992 | Iizuka et al. | 477/174 X |
| 5,628,706 | 5/1997 | Zhang | 477/175 X |
| 5,704,871 | 1/1998 | Furukawa et al. | 477/174 X |
| 5,725,456 | 3/1998 | Fischer et al. | 477/174 |
| 5,738,609 | 4/1998 | Jones et al. | 477/175 |

*Primary Examiner*—Khoi Q. Ta
*Attorney, Agent, or Firm*—Donald F. Scherer

[57] ABSTRACT

A powertrain for a vehicle includes an engine, a multi-speed transmission and control, and output drive mechanisms. The transmission has an electro-hydraulic control for establishing the transmission drive ratios and the interchange therebetween. The ratios are established by a plurality of friction devices, one of which is engaged for the lowest forward ratio. The control has a microcomputer which evaluates vehicle operating parameters and maintains the transmission properly controlled in response to various input signals. The transmission is maintained in an auto neutral condition when the engine is at idle, the transmission output speed is zero, the vehicle brakes are engaged and the forward drive has been selected. The control continually adjusts the pressure in the one friction device to maintain the torque capacity thereof in a range less than full engagement and greater than a minimum value.

10 Claims, 12 Drawing Sheets

AUTOMATIC TRANSMISSION AUTO NEUTRAL CLUTCH CONTROLS WITH INTERMITTENT SLIP AND A METHOD OF CONTROL

TECHNICAL FIELD

This invention relates to an automatic transmission and controls and a method of controlling an automatic transmission to provide a neutral function.

BACKGROUND OF THE INVENTION

When the transmission selector is in range, the vehicle brake is applied, throttle is at zero, and the vehicle is stopped, it is desirable that the transmission is shifted to neutral. If the vehicle brake is disengaged, the transmission returns to the range and mode determined by shift selector position and system constraints. This provides fuel savings for applications in vehicle operating cycles with many start stop cycles. It is important that this feature be transparent to the driver by minimizing the shift disturbance. Clutch fill time and/or early throttle application have been the cause for undesirable shift disturbances with the current auto neutral mechanization.

Automatic neutral, an option on some transmissions, has the objective of saving fuel by automatically shifting the transmission to neutral when the vehicle comes to a stop and the vehicle brake is applied. The transmission automatically shifts back to forward drive when the vehicle brake is released by the operator. This generally involves disengaging the forward clutch, when auto neutral is requested, and reengaging the clutch when the vehicle brake is released. However, the fill time associated with the clutch and the driver's capability to increase the throttle setting during the fill time can result in undesirable shift quality and heat generation at the clutch.

Auto neutral controls have encompassed one of the following approaches:

1. The partial fill method which tries to keep the clutch filled without clutch plate contact. This is done by controlling the clutch apply pressure through three consecutive ramps followed by holding the clutch pressure constant. Test results have shown that, although this method reduces the fill time, it produces inconsistent clutch fill times due to variable holding pressure and gradual leakage at the clutch which can result in an undesirable shift, and 2. The torque converter slip control method which maintains the clutch filled by controlling the torque converter slip at a very low level. An advantage of this method is that there is substantially constant fill time. A disadvantage is the possibility of heat generation at the clutch due to continuous slip which can reduce transmission life.

SUMMARY OF THE INVENTION

It is an object of the present invention to provide an improved system for clutch control during an auto neutral.

In one aspect of the invention the control system optimizes the auto neutral function by alternating between slipping a clutch and holding the clutch pressure at a small threshold below full clutch engagement.

Advantages achieved with this invention include:

1. It minimizes heat generation at the clutch by intermittently slipping the clutch, and;

2. It greatly reduces the clutch fill time by minimizing the amount of time that the clutch is not completely filled, resulting in:
   a. detecting and memorizing the maximum pressure level required to keep the clutch automatically filled but not transmitting torque;
   b. detecting and memorizing the minimum pressure level required to keep the clutch substantially filled but slipping at a minimum detectable level; and
   c. controlling the clutch between the pressure levels established in steps (a) and (b) based on an adaptable profile to achieve a predetermined time interval.

DESCRIPTION OF THE DRAWINGS

FIG. 3 is an algorithm in block diagram form representing instructions for the computer based control.

DESCRIPTION OF AN EXEMPLARY EMBODIMENT

Figure 1:
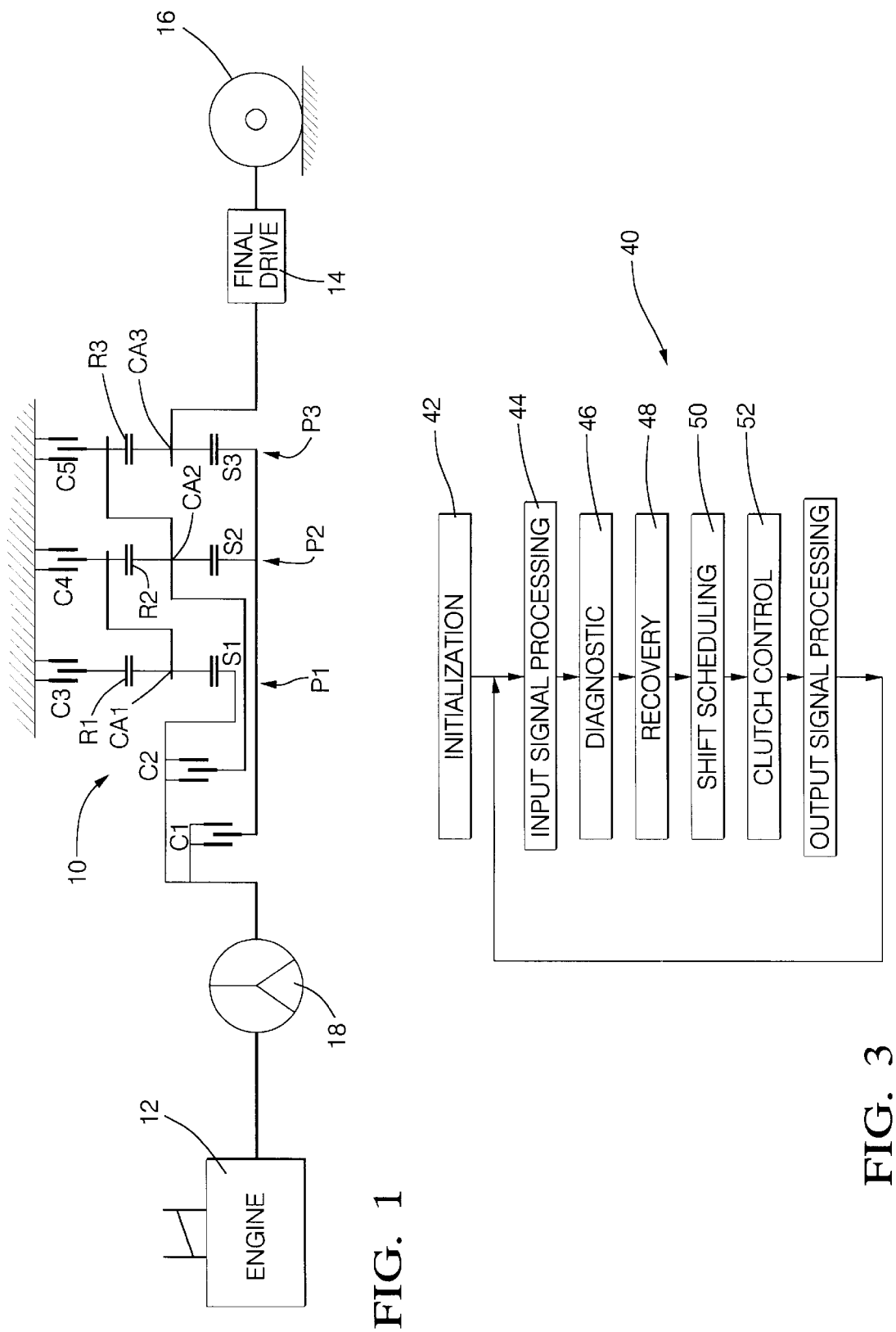
FIG. 1 is a schematic diagram of a vehicle powertrain.
Figure 2:
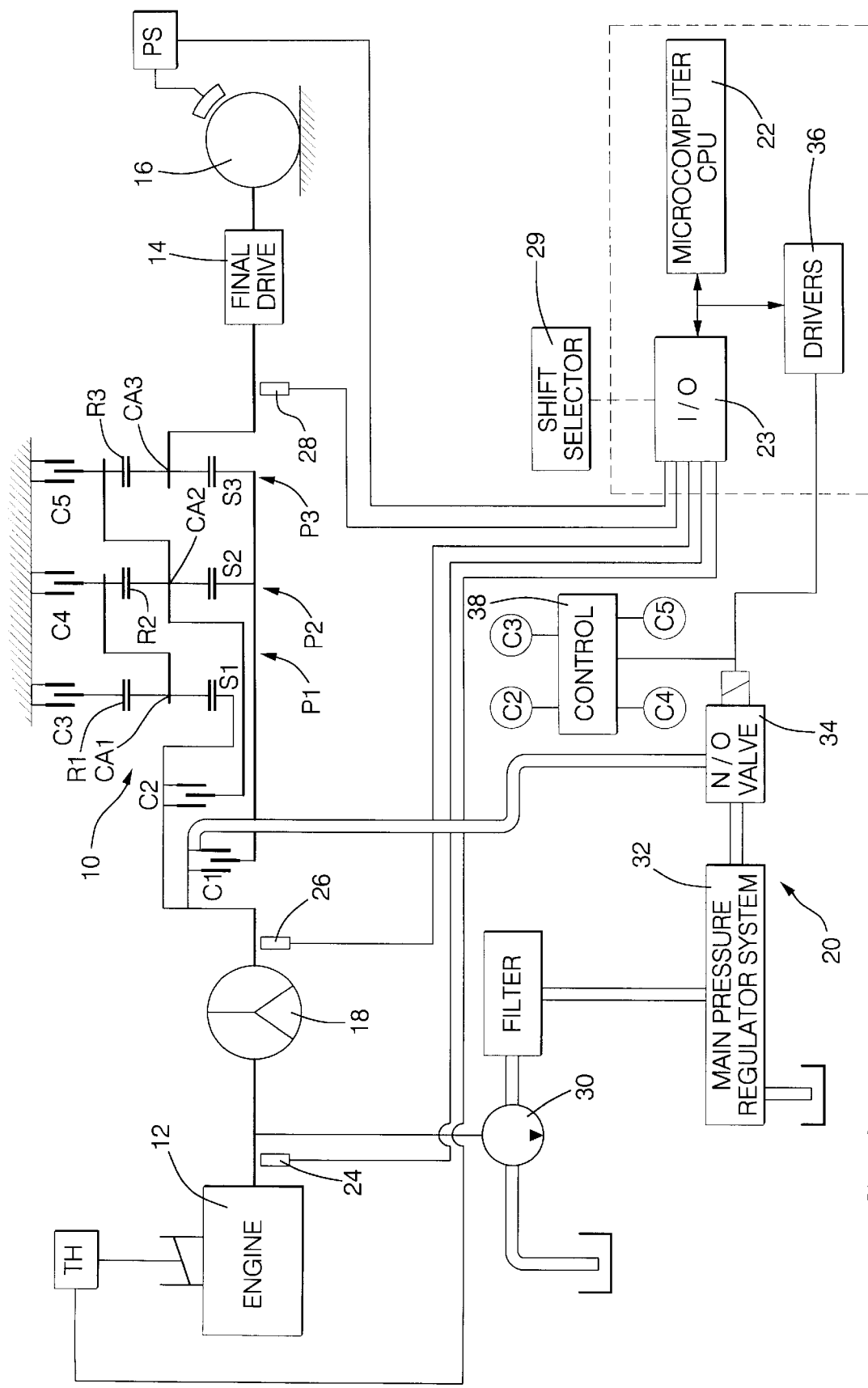
FIG. 2 is a schematic and block diagram of a vehicle powertrain and a computer based control.

Referring to FIGS. 1 and 2, there is seen a powertrain having a power transmission 10 which provides multiple ratios between an engine 12 and a final drive 14. The final drive 14 is connected to an output driven member of the vehicle, such as wheels 16.

The power transmission incorporates three planetary gear sets P1, P2, P3 which are effectively controlled in six forward ratios by a plurality of selectively engageable friction devices including two selectively engageable clutches C1, C2 and three selectively engageable brakes C3, C4, C5. Each gear set P1, P1, P3 has a respective sun gear S1, S2, S3; a respective ring gear R1, R2, R3; and a respective carrier assembly CA1, CA2, CA3. The power transmission 10 is further described in U.S. Pat. No. 4,070,927 issued to Polak, Jan. 31, 1978. The brakes and clutches are pressure applied and spring released. These are conventional friction devices and their assembly and use is well known within the art. As described in the Polak patent, the transmission will provide six forward speeds and one reverse speed through application of various combinations of the clutches and brakes. The engagement of clutch C1 and brake C5 will produce the first and lowest drive ratio between the engine 12, a torque converter 18 and the final drive 14. The clutch C1 is modulated to provide an auto neutral function.

The apply and release of all friction devices including clutch C1 is under control of a conventional electro-hydraulic control 20 which utilizes a number of inputs from various driving conditions to determine the desired drive ratio. The electro-hydraulic control 20 is depicted diagrammatically in FIG. 2. It includes a microcomputer (MC) 22 with a central processing unit (CPU) which receives input signals from a throttle sensor or fuel feed TH, a brake switch PS, an engine input speed sensor 24, a turbine speed sensor 26, an output speed sensor 28 and an operator controlled shift selector 29. The turbine speed sensor 26 is also the transmission input speed sensor. The microcomputer 22 also provides a signal for controlling the actuation pressure of the friction devices C1–C5.

System pressure is established by a conventional positive displacement pump 30 and a regulator valve 32. A solenoid valve 34, which controls the engagement pressure of clutch C1, receives electrical signals from electronic drivers 36 which in turn are controlled by the microcomputer. The drivers 36 also provide signals via a control 38 to pressurize and exhaust the friction devices C2, C3, C4 and C5.

FIGS. 3 through 13 are flow diagrams representative of computer program instructions, executed by the computer based control of FIG. 2 to establish the engagement and disengagement of the friction devices C1–C5 and an auto neutral function at the clutch C1.

FIG. 3 represents an executive or main loop program 40 which directs the sequential execution of various subroutines. Step 42, Initialization, designates a series of instructions executed at the initiation (i.e.: vehicle startup) of each period of vehicle operation for setting the various timers, registers, and variable values of the control unit to predetermined initial values. Thereafter, the program is sequentially and repeatedly executed as indicated by the flow diagram lines at a rate which typically may be 16 msec per loop. After initialization 42, the various input signals 23 are read, step 44, and conditioned for use by the microcomputer 22. The input signals 23 are tested for integrity and the system operation is monitored to diagnose any operational problems at boxes or steps 46, 48.

Step 50 analyzes the various system input signals to decide if a shift or ratio change shall be commanded and then performs the required action. A shift is performed by controlling the interchange of the clutches and brakes. A clutch control at step 52 analyzes the various system input signals and develops pressure command signals for operation of each friction device. An auto neutral function, described in FIGS. 3 through 12, analyzes the input signals 23 from throttle TH, brake switch PS and speed sensors 24, 26, 28 and develops a clutch C1 pressure command signal or strategy. The command signals are conditioned to effect the solenoid drive currents to carry out the pressure commands for specific shift operations as well as auto neutral and distributes the required control signals to the drivers for controlling the solenoid valves in the control 38.

Figure 4:
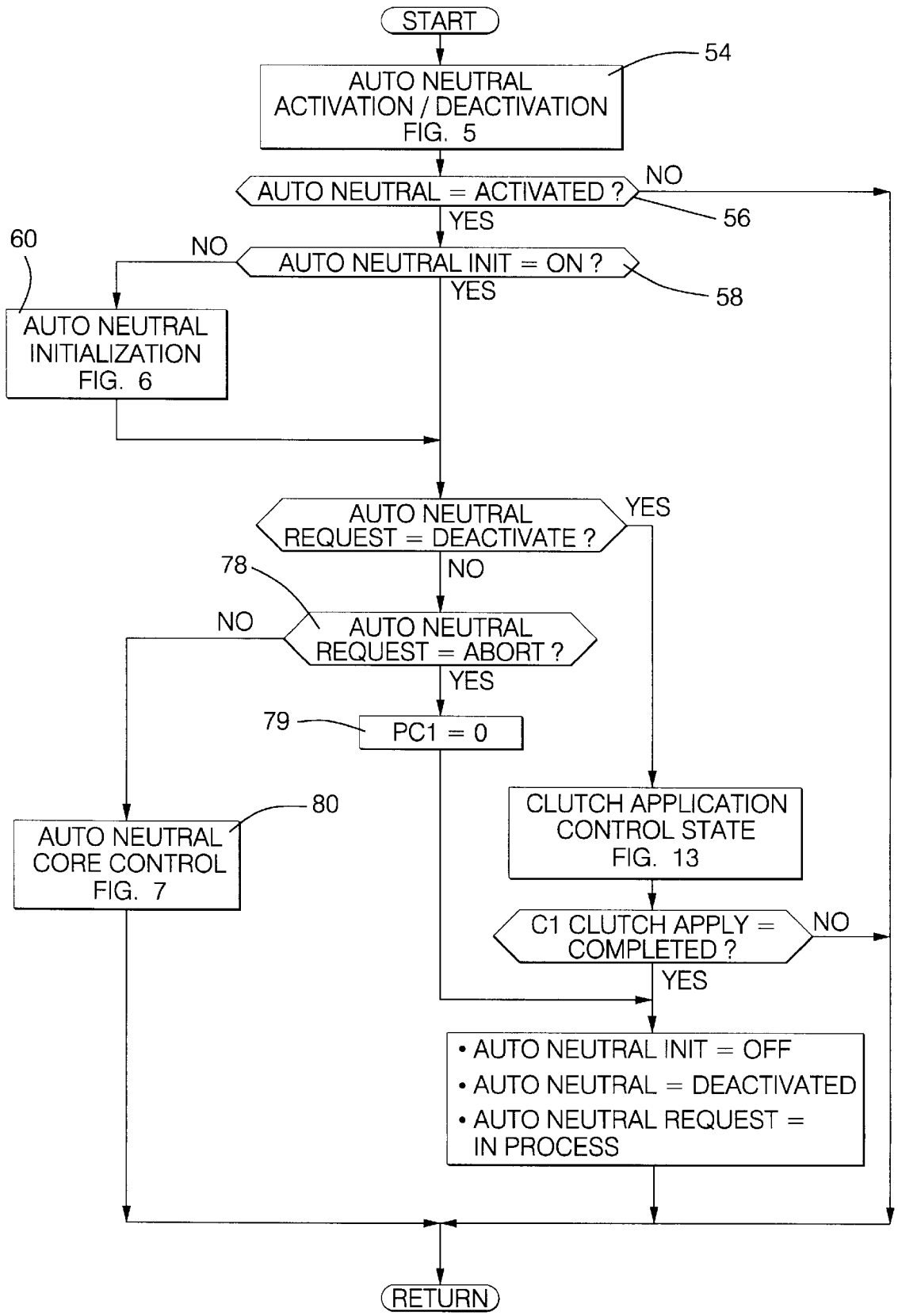
FIGS. 4 through 13 are algorithms in block diagram form representing subroutines within the algorithm of FIG. 3.

The routine for auto neutral function control is shown in algorithm form in FIG. 4. The routine starts with auto neutral activation/deactivation procedure at step 54 which in turn determines the requested mode of operation in FIG. 5. If auto neutral has been activated at steps 56 and 58 in FIG. 4, the routine initializes parameters at step 60 for the auto neutral function once as shown in FIG. 6. As long as the auto neutral function is actively requested, the auto neutral core control provides the logic for controlling the torque capacity of the clutch C1. However, if the auto neutral deactivation is requested at steps 62 through 66, the clutch application control state, described in FIG. 13, will reapply the clutch C1 to bring the system back to its original forward mode. The auto neutral function can be aborted at step 70 only when the shift selector 29 is changed by the operator. Aborting will result in the complete disengagement of the clutch C1.

Figure 5:
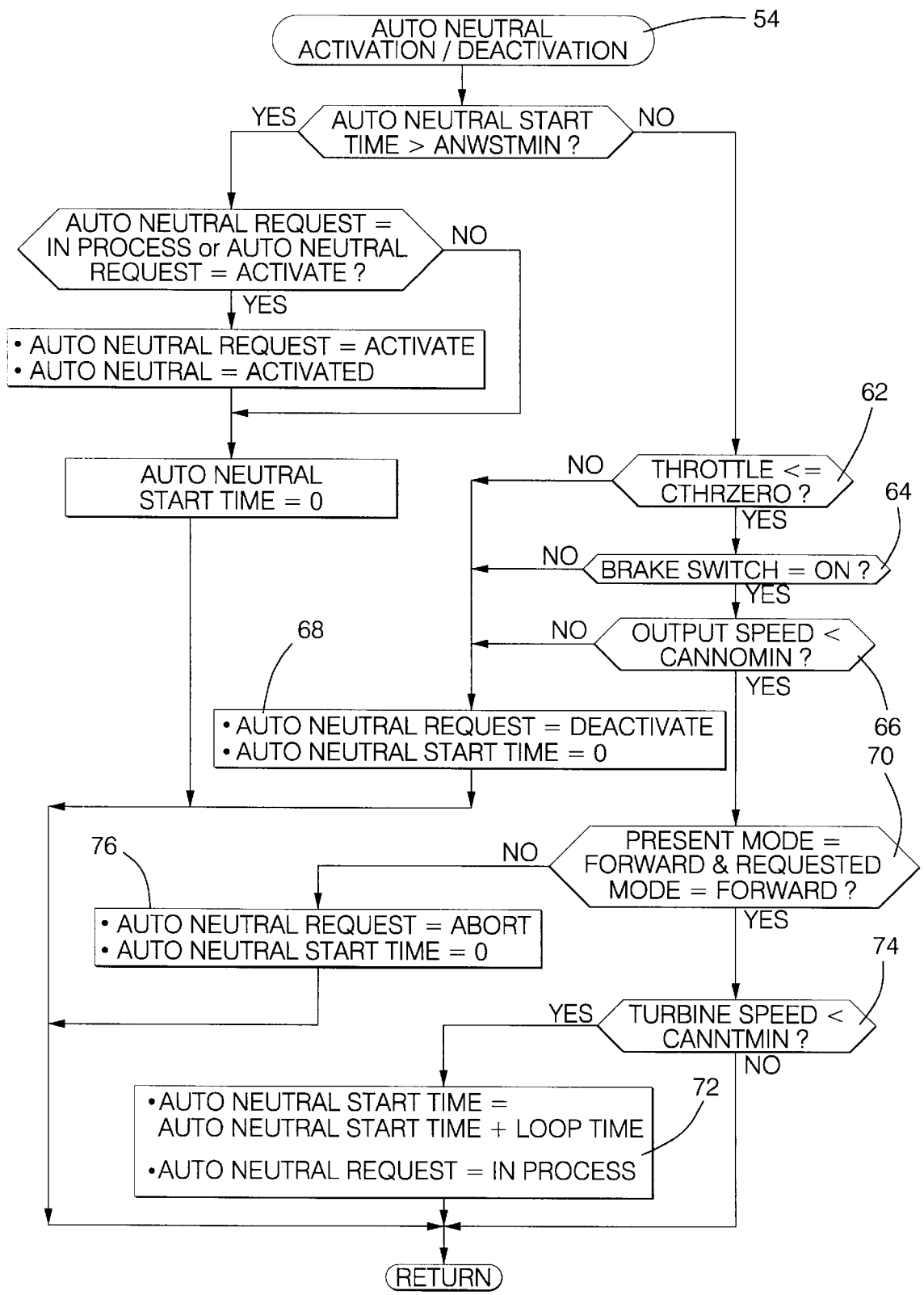
Figure 6:
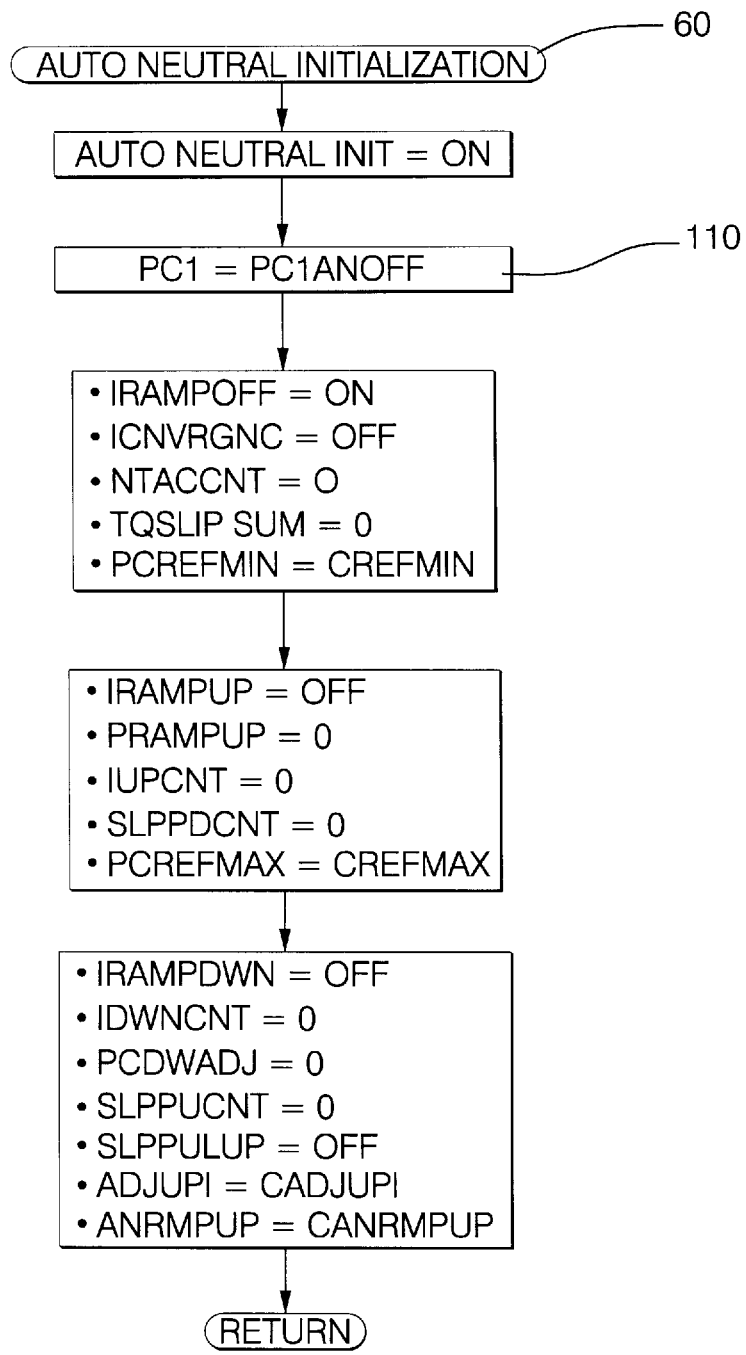

Referring to FIG. 5, automatic neutral is activated when the conditions described below have existed for a calibration time period (ANWSTMIN), step 72:

1) Throttle position is in the near zero throttle zone (CTHRZERO), step 62.
2) Transmission output speed is less than its minimum calculable value (CANNOMIN), step 66.
3) The brake is applied, step 64.
4) Transmission turbine speed is less than its minimum calculable value (CANNTMIN), step 74.
5) Forward is the selected and attained direction, step 70.

The auto neutral is deactivated when either condition 1, 2 or 3 above are not satisfied. The auto neutral is aborted (step 76, FIG. 5 and step 78, FIG. 4) if any mode other than forward is selected or attained. When this occurs, the clutch C1 pressure is exhausted at step 79 (FIG. 4).

Figure 7:
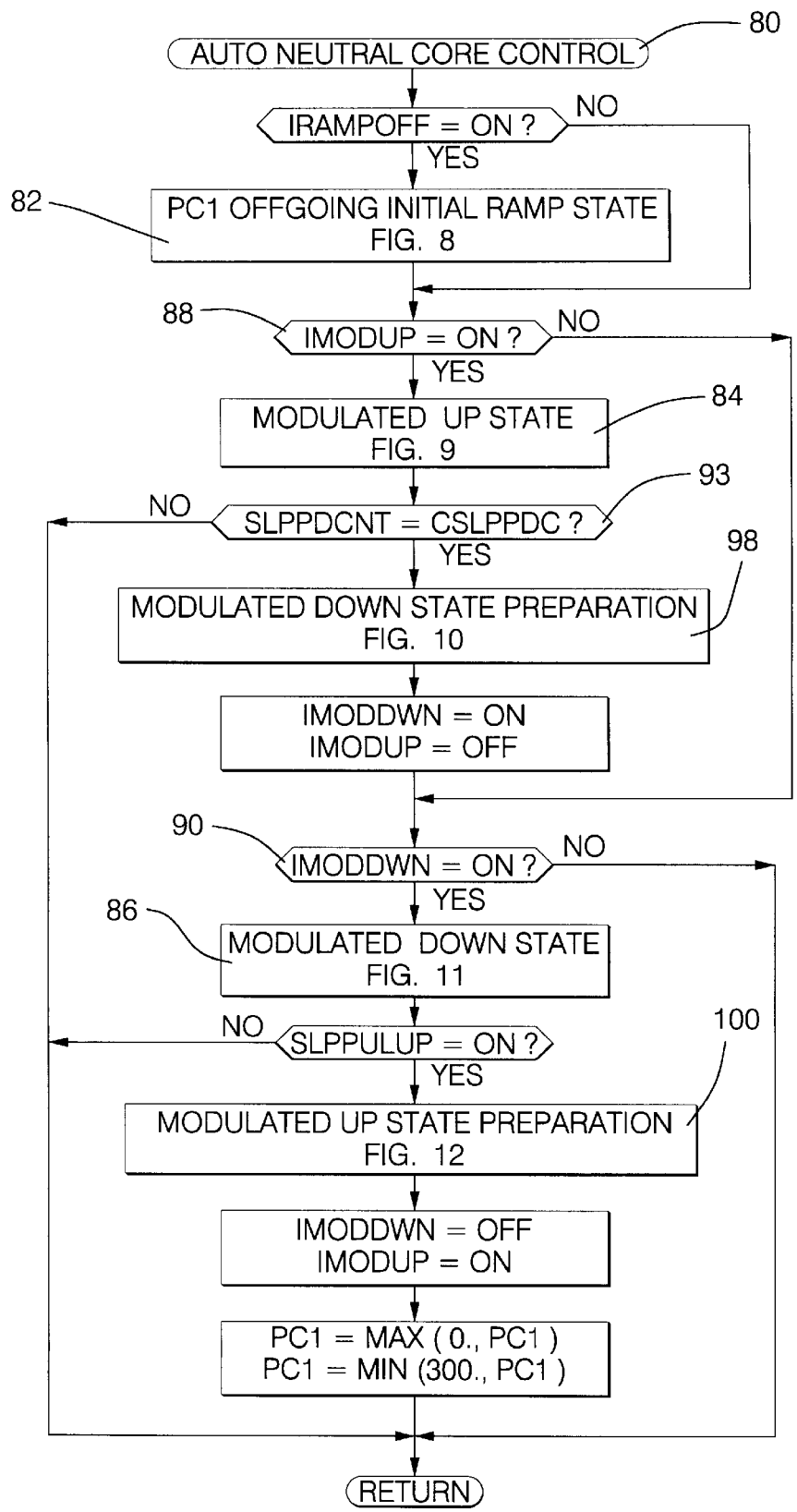

If the auto neutral is to be activated, step 80 in FIG. 4 passes to the routine in FIG. 7 and the subroutines thereunder. FIGS. 7 through 12 describe the details of the auto neutral function.

Referring to FIG. 7, when the auto neutral control is commanded, three different states of operations can occur. The first state, PC1 Offgoing Initial Ramp step 82 (FIG. 8) is performed at the beginning of the auto neutral shift while the second and third states, Modulated Up step 84 (FIG. 9) and Modulated Down step 86 (FIG. 11), are alternated thereafter as long as the auto neutral function is requested. The alternations between these two states are shown by two switching flags IMODUP step 88 and IMODDWN step 90, respectively. The Modulated Up state step 84 (FIG. 9) is terminated when the slip pulldown counter (SLPPDCNT) equals a calibration constant (CSLPPDC) at step 93 (FIG. 7). Likewise, the Modulated Down state step 86 (FIG. 11) is completed when the slip pull up condition is satisfied (SLPPULUP=ON) at steps 94, 96. At completion of each state, the program enters a procedure at step 98 (FIG. 10) for a modulated down state preparation, or at step 100 (FIG. 12), for a modulated up state preparation to prepare for entry to the next state.

Figure 8:
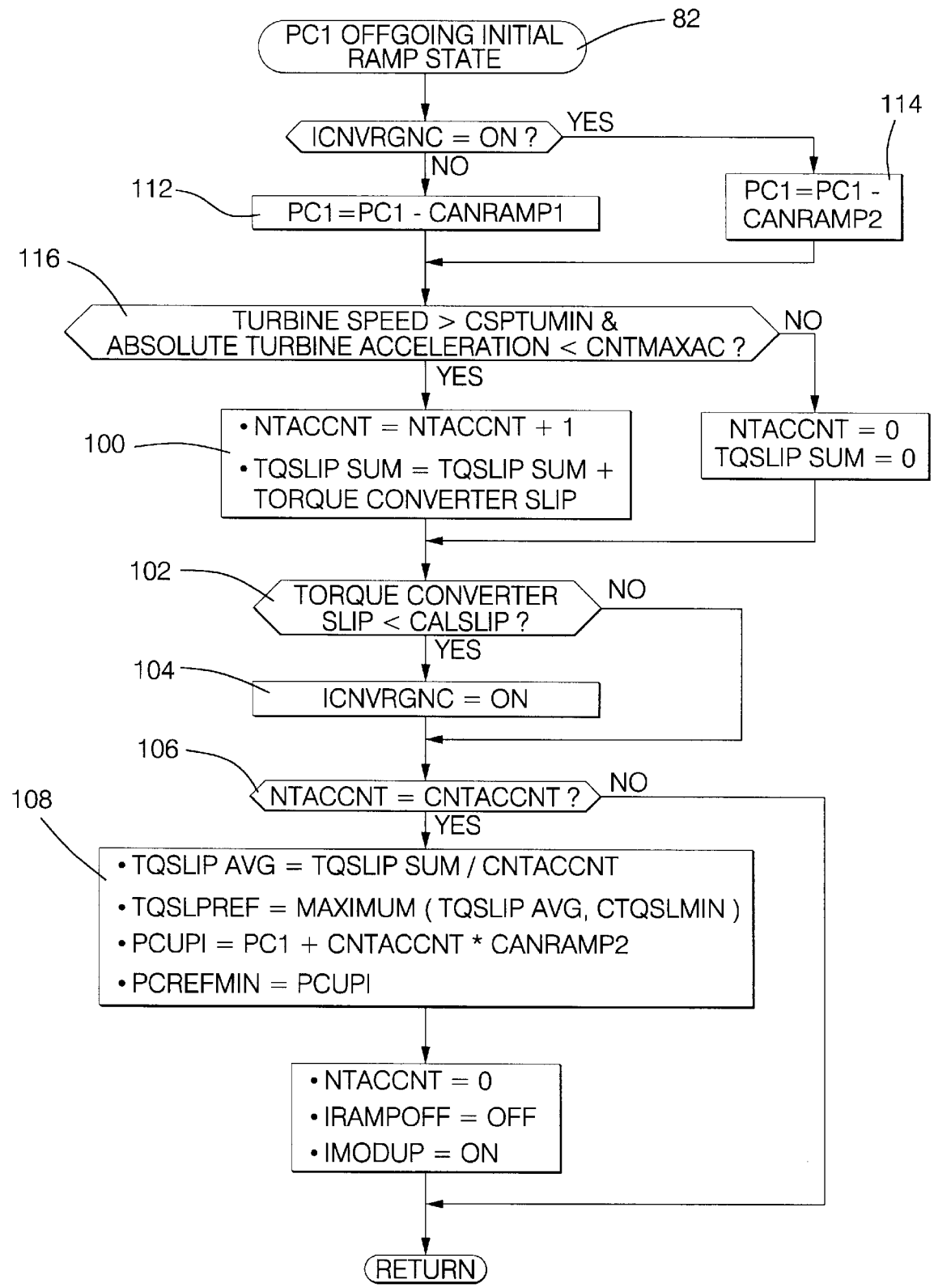

Referring to FIG. 8, the PC1 Offgoing Initial Ramp state initiates when clutch C1 is applied, turbine and output speeds are zero and engine speed is at some level slightly lower than idle represented by time T1 in FIGS. 14A through 14G. At the end of this state, time T2, the clutch C1 pressure is below the torque transmitting pressure and turbine and engine speed at or near idle speed. During this state, the torque converter slip is monitored in steps 100 through 106 to find a reference torque converter slip (TQSLPREF) at step 108 for use in the Modulated Up 84 and Modulated Down 86 states.

The clutch C1 pressure, which was initialized to a calibration constant (PC1ANOFF) at FIG. 6 step 110, is ramped down at a constant rate (CANRAMP1) at step 112 (FIG. 8), until torque converter slip is less than a calibration constant (CALSLIP). The pressure is then ramped down at a lower rate (CANRAMP2) at step 114 (FIG. 8) in search for a pressure where the clutch C1 is not transmitting torque. Turbine acceleration is used as the indicator for clutch C1 opening detection. When turbine acceleration is less than a calibration constant (CNTMAXAC) and turbine speed is less than another calibration constant (CSPTUMIN) at step 116 for CNTACCNT consecutive times at step 106, this state is terminated. Turbine speed is used to eliminate turbine acceleration acceptance when the turbine speed is below the calculable threshold.

At the end of this initial offgoing ramp state, several variables, such as Torque Converter Slip Reference (TQSLPREF), initial clutch pressure for Modulated Up state (PCUPI), and a minimum reference pressure (PCREFMIN), are calculated at step 108 for the next state as follows:

1) Calculate an average torque converter slip during convergence TQSLIPAVG=TQSLIPSUM/CNTACCNT;
2) Calculate a reference slip indicative of no torque converter slip TQSLPREF=MAX(TQSLIPAVG, CTQSLMIN);

3) Calculate an initial C1 pressure for the Modulated Up state PCUPI=PC1+CNTACCNT*CANRAMP2;

4) Set a minimum reference pressure PCREFMIN= PCUPI.

Of particular interest is the minimum reference pressure, PCREFMIN. By end of this initial state, it is determined that clutch C1 will not transmit torque at a pressure equal or less than PCREFMIN. This pressure will also be updated in Modulated Up state preparation (FIG. 12) in search for the maximum pressure where the clutch is not transmitting torque.

Figure 9:
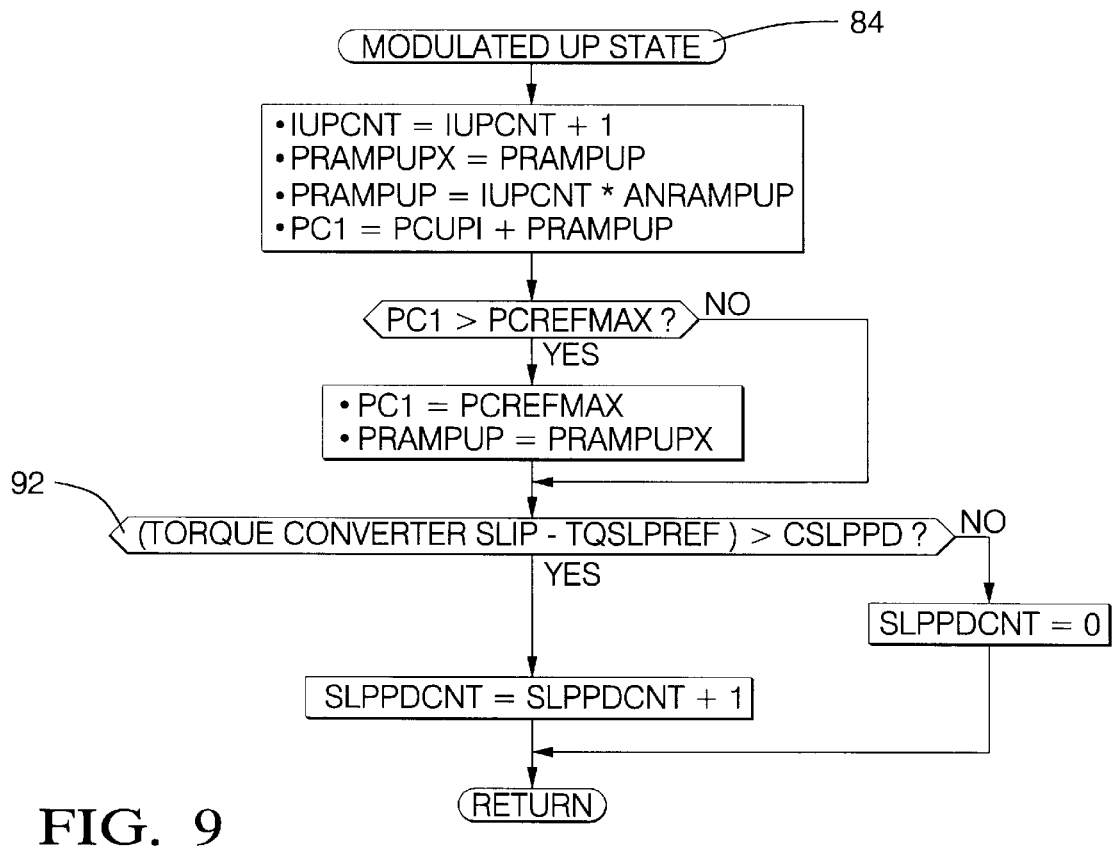
Figure 10:
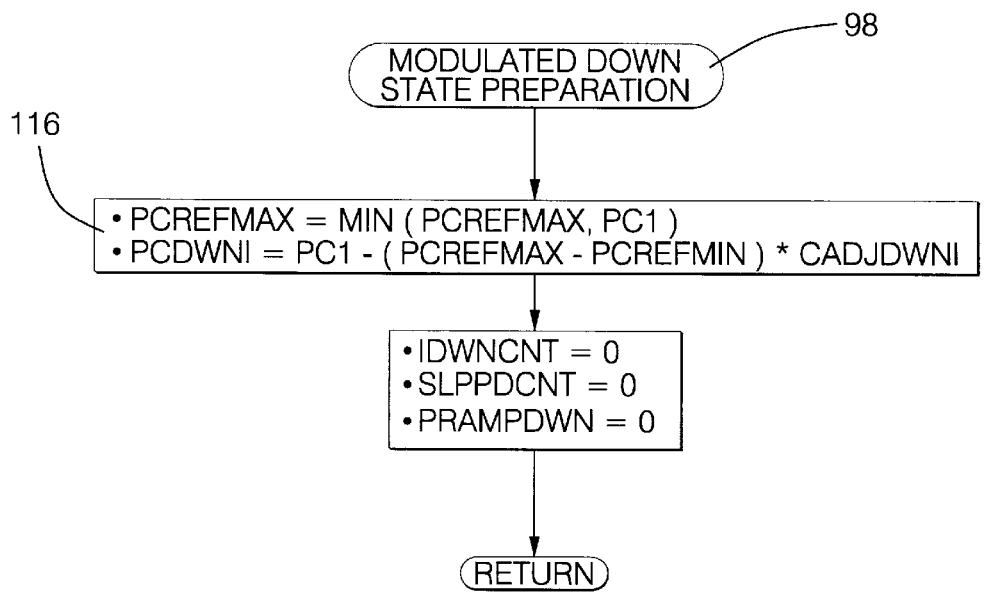

Referring to Modulated Up state in FIG. 9, the pressure calculation starts with an initial pressure of PCUPI (determined in PC1 Offgoing Initial Ramp state, FIG. 8, or Modulated Up state preparation FIG. 11), and being ramped up at an adaptable rate of ANRMPUP starting at time T2. The intent of this state is to fill the clutch within a predetermined time T2 to T3 and pull the turbine speed down at a reasonably small rate after the clutch is filled. The pressure commanded during this state is always limited to a maximum reference pressure (PCREFMAX). This state is complete when the difference between torque converter slip and TQSLPREF is greater than a calibration constant (CSLPPD) at step 92, for CSLPPDC consecutive loops.

At the end of the Modulated Up state at time T3, the maximum reference pressure (PCREFMAX) is updated at step 116 (FIG. 10) to determine the lowest pressure that fills the clutch and pulls the turbine down. This pressure will be used as the maximum allowable pressure when the Modulated Up state is activated again.

A clutch pressure is also calculated for the next Modulated Down state at step 116 (FIG. 10), as follows:

$$PCDWNI=PC1-(PCREFMAX-PCREFMIN)*$$

CADJDWNI where CADJDWNI is a calibration constant.

Initializing the pressure for the Modulated Down state to a lower value can reduce the amount of time that the clutch can slip at a relatively high rate and thereby eliminate the excessive heat generation. It also minimizes the engine speed variation during auto neutral.

Figure 11:
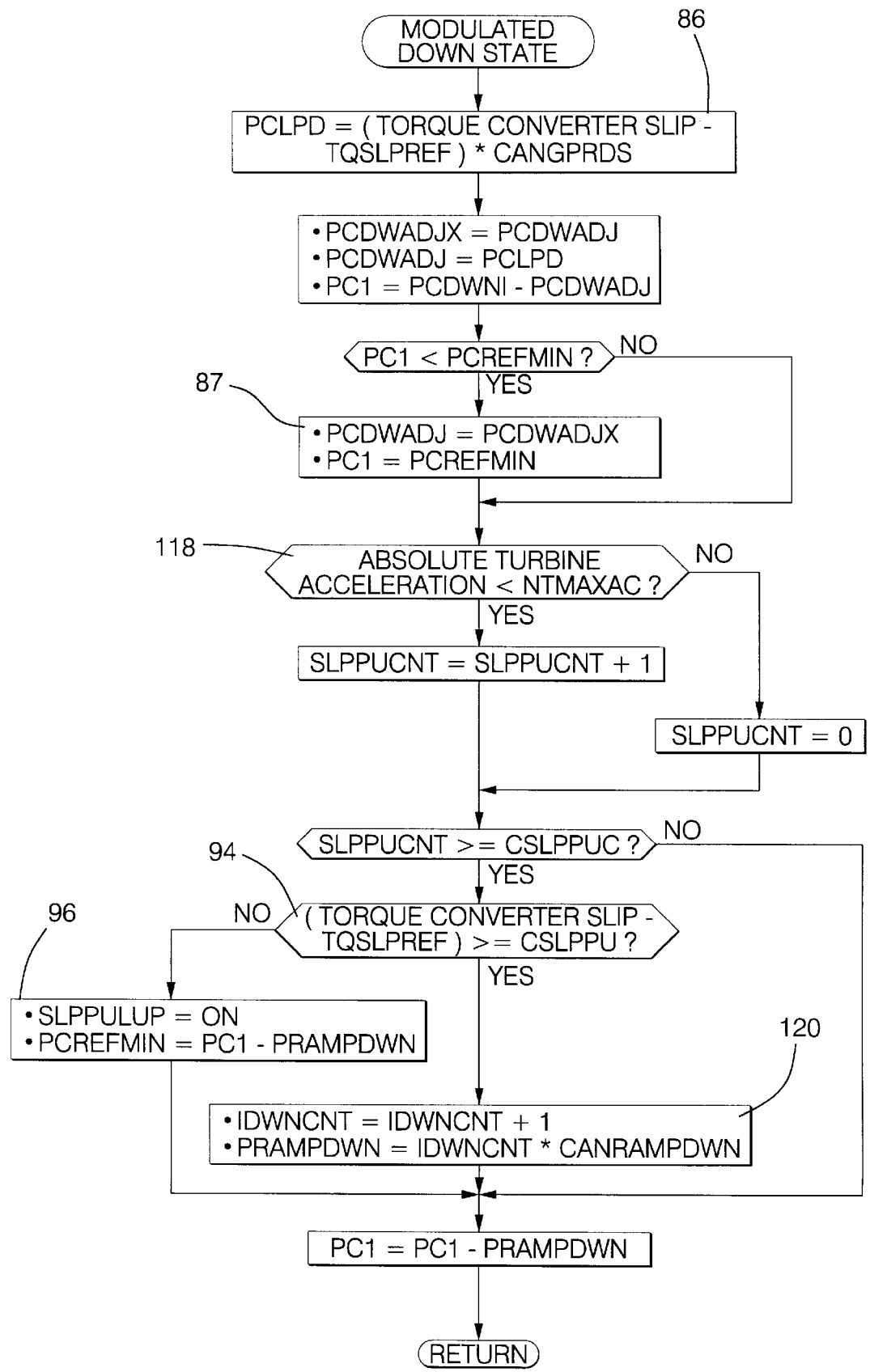

After the turbine pulldown, it is desired to reduce the pressure down again in search for a reference pressure where the clutch is not transmitting torque, while remaining almost filled. Referring to FIG. 11, during the Modulated Down state step 86, pressure control is continuously performed by a proportional controller to reduce the absolute turbine acceleration below a calibration constant (NTMAXAC) at step 118 for CSLPPUC consecutive times. When this occurs, the error between TQSLPREF, determined in PC1 Offgoing Initial Ramp state, FIG. 8 step 108, and torque converter slip is examined at step 94 to ensure the clutch is not dragging. If the clutch drag is detected, the pressure is further adjusted downward by using a ramp (CANRMPDW) at step 120.

The pressure is limited to a minimum reference pressure (PCREFMIN) at step 87 to maintain the pressure at the highest level possible without slipping the clutch. PCREFMIN can be adjusted downward only when the clutch system characteristic change during the auto neutral control and clutch drag occurs.

The Modulated Down state is terminated at time T4 when the difference between torque converter slip and TQSL-PREF is greater than a calibration constant (CSLPPU) at step 94, and the absolute turbine acceleration is below a calibration constant (NTMAXAC) at step 118 for at least CSLPPUC consecutive times.

Figure 12:
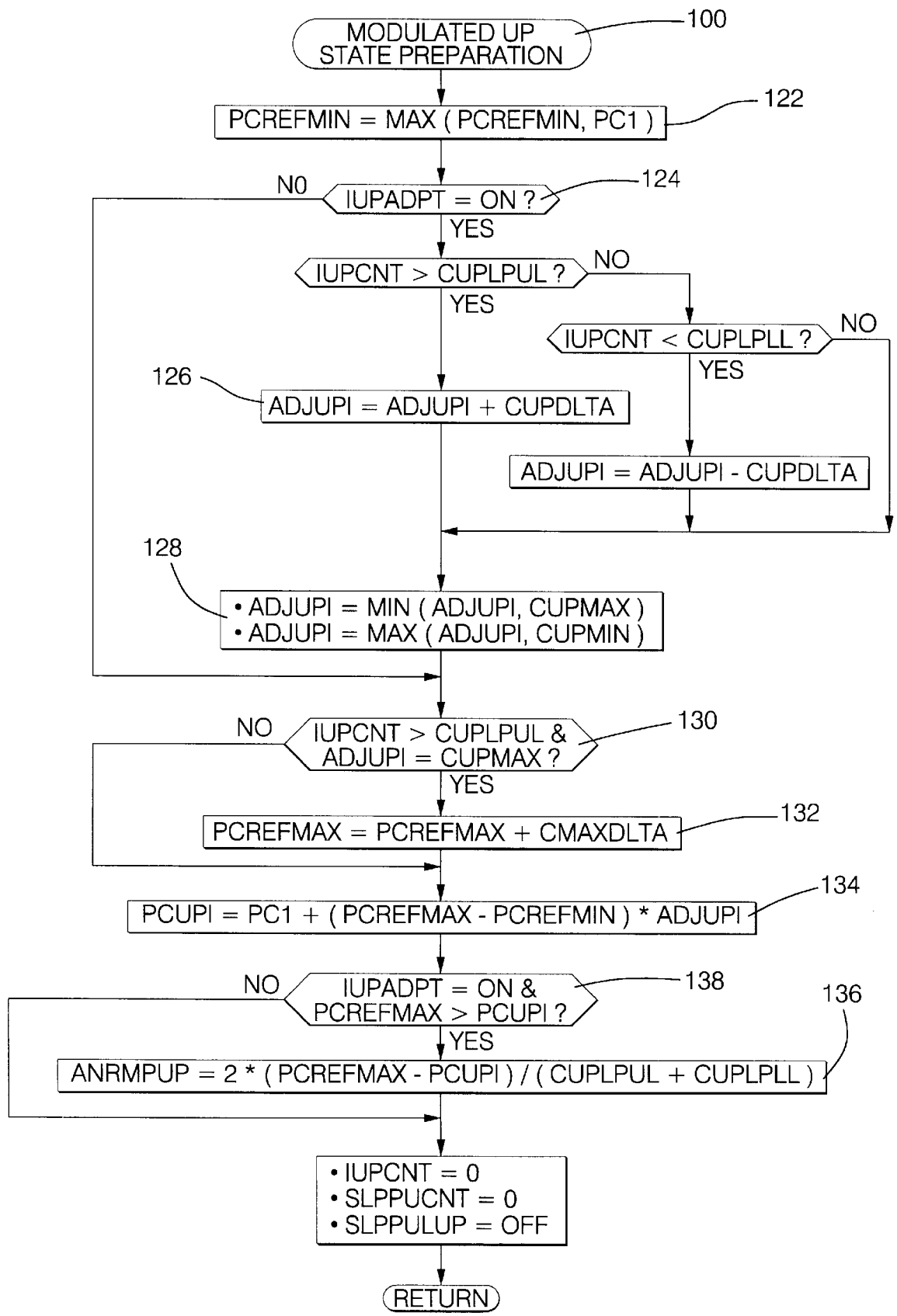

Referring to FIG. 12, the following steps are taken to prepare for future states, the Modulated Up (FIG. 9) followed by the Modulated Down (FIG. 11).

At step 122, the minimum reference pressure (PCREFMIN) is updated based on the last commanded pressure PC1 and previous PCREFMIN.

If adaptation is selected by a calibration constant (IUPADPT) at step 124, an initial pressure adjusting factor (ADJUPI) is changed at a calibratable delta (CUPDLTA) at step 126 to adjust the time spent in the Modulated Up state. The adjustment factor is limited by an upper limit (CUPMAX) and a lower limit (CUPMIN) at step 128. The time in the Modulated Up state can effect the clutch cooling (more time provides more clutch convection cooling) and fill time (less time provides a shorter fill time).

If the adjusting factor (ADJUPI) reaches the upper limit (CUPMAX) and fill time is still larger than the predetermined level (CUPLPUL), the maximum reference pressure (PCREFMAX) is adjusted upward by a calibration constant (CMAXDLTA) at steps 130, 132, to reduce the fill time. The maximum reference pressure (PCREFMAX) can be adjusted upward even when adaptation is not selected.

The adjusting factor ADJUPI is used to determine the initial pressure (PCUPI) for the Modulated Up state at step 134; followed by a new ramp rate being calculated (ANRMPUP) at step 136 if the adapting ramp up factor (IUPADPT) is on and the maximum reference pressure (PCREFMAX) is greater than the initial pressure (PCUPI) at step 138.

ADJUPI, ANRMPUP, and PCREFMAX will adaptively change until the predetermined time of operation in the Modulated Up state is met.

The initial pressure for Modulated Up state (PCUPI) is calculated as follows:

$$PCUPI=PC1+(PCREFMAX-PCREFMIN)*ADJUPI$$

where

ADJUPI is a calibration constant originally initialized in FIG. 6.

From this point on, as explained above, the states will be alternated between the Modulated Up state and the Modulated Down state as long as the auto neutral function is active. This action allows the clutch to stay almost filled while minimizing the clutch slip.

Figure 13:
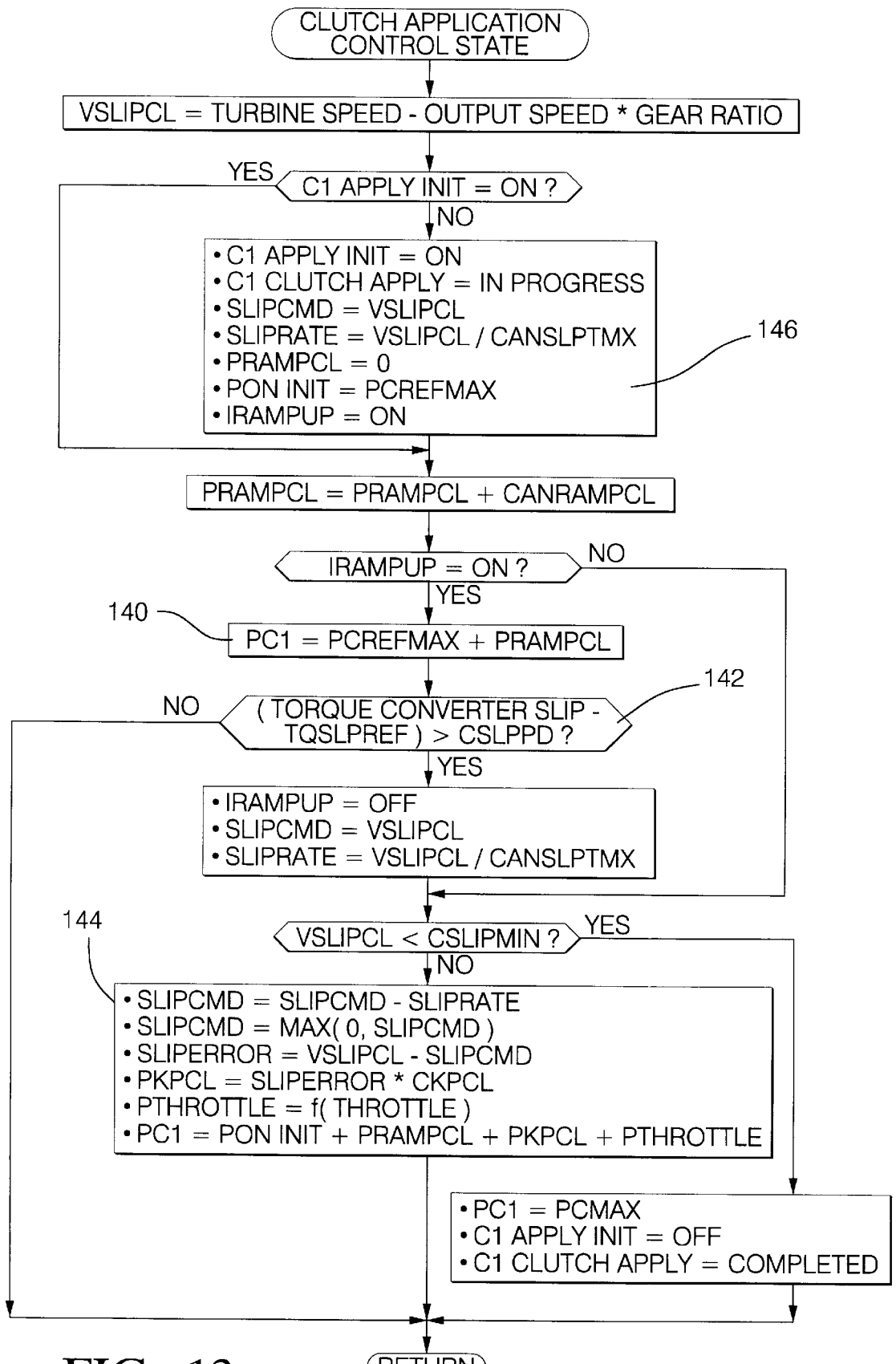
Figure 14A:
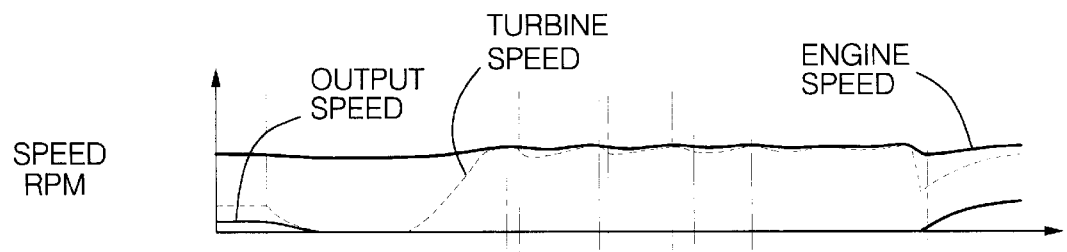
FIGS. 14A through 14G are curves representing various parameters and signals versus time use by the algorithms of FIGS. 3 through 13.
Figure 14B:
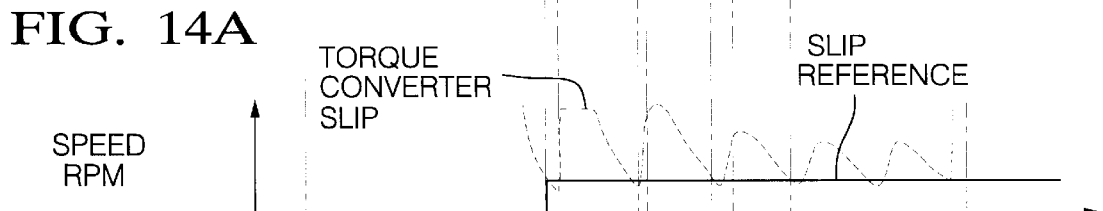
Figure 14C:
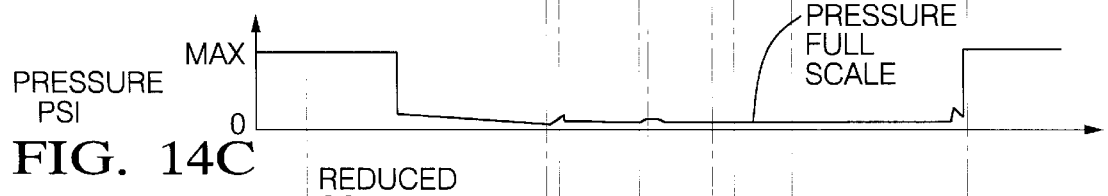
Figure 14D:
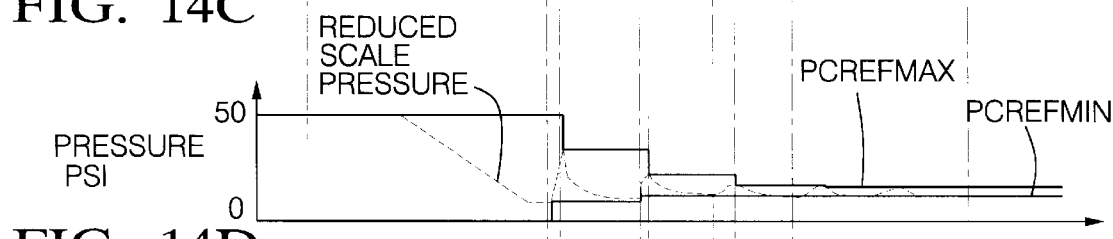
Figure 14E:
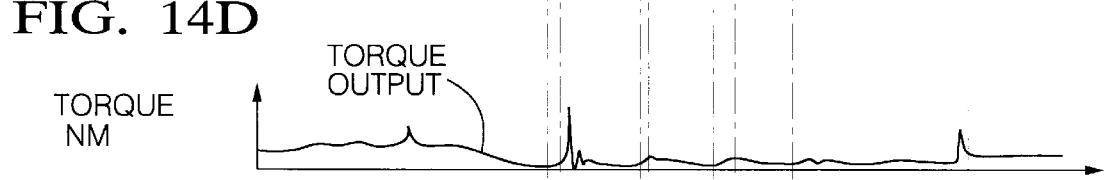
Figure 14F:
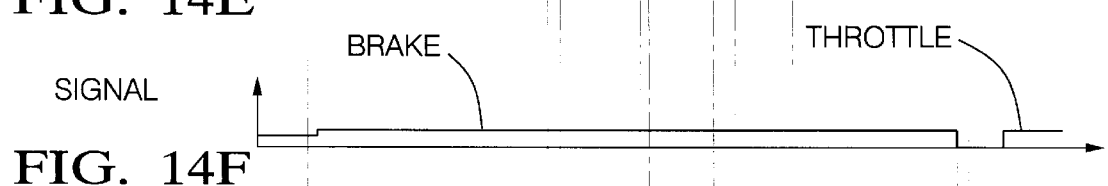
Figure 14G:
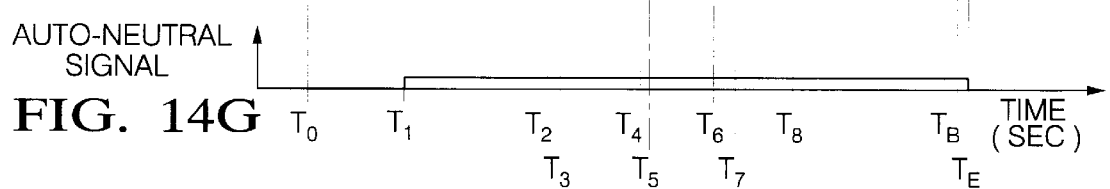

Upon auto neutral deactivation at time TE, it is important to apply the clutch rapidly with minimum amount of torque disturbance. FIG. 13 depicts the clutch application control state after the auto neutral deactivation. If auto neutral is deactivated while in any state other than Modulated Up state, the clutch is already filled and the clutch pressure control can start immediately.

If auto neutral is deactivated while in Modulated Up state, the ramp will be continued at a different calibratable rate (CANRAMPCL) as determined at step 140 (FIG. 13), starting from maximum reference pressure (PCREFMAX) until the pulldown is detected. Since the clutch is almost filled and the pressure command starts at a higher level, it is expected to complete the fill time prior to any throttle increase by the driver. The clutch fill is detected when the difference between the torque converter slip and TQSL-PREF is greater than a calibration constant indicating the turbine pulldown at step 142. At this point, the clutch pressure control will begin.

The clutch pressure control is based on the following equation at step 144:

PC1=PON INIT+PRAMPCL+PKPCL+PTHROTTLE where

PON INIT is maximum reference pressure (PCREFMAX) determined in Modulated Up state at step 146, PRAMPCL is the pressure ramp, PKPCL is a proportional term which is calculated based on error between the clutch slip (VSLIPCL) and slip command (SLIPCMD).

The commanded slip rate (SLIPRATE) is determined based on an initial slip speed and desired clutch control duration defined by a calibration constant (CANSLPTMX) at step 146.

PTHROTTLE is a pressure compensation term as a function of throttle as defined by input signal TH.

The clutch is engaged when slip speed across the clutch (VSLIPCL) is less than a calibration constant (CSLIPMIN). At this point the pressure is increased to maximum and auto neutral shift is considered complete.

FIGS. 14A through 14G depict a computer simulation result of the auto neutral function. After the auto neutral activation, the PC1 Offgoing Initial Ramp state is initiated at Ti. The pressure is ramped down at two different rates until the turbine and engine speed are converged at T2. After convergence, the pressure is ramped up (Modulated Up state) until the turbine pulldown is detected at T3. At this point, the initial pressure is adjusted to a lower value and controlled (Modulated Down state) until the maximum pressure with no clutch slip condition is detected at T4. As long as the auto neutral function is active, the Modulated Up states (T4–T5), (T6–T7) and Modulated Down states (T5–T6), (T7–T8) are alternated to keep the clutch almost filled and yet, minimize the clutch slip. The modulation of pressure ceases at Time TB when the vehicle brakes are deactivated, the throttle is increased, the gear selection changes, or the output speed increases.

Of particular interest is the system learning capability to find the maximum and minimum pressures required and to modulate the pressure between these two extremes. When the auto neutral deactivation is requested, the pressure is controlled in accordance with the algorithm shown in FIG. 13 until the synchronization speed across the clutch is detected. At this point the auto neutral function is deactivated and normal transmission operation resumes. If the auto neutral is aborted, the pressure at clutch C1 and therefore the torque capacity is substantially reduced. The pressure at the clutch C1 may be regulated at a very low value which is insufficient to overcome the return spring but maintain the clutch apply chamber filled at minimum volume. This is a well known technique used in many friction devices.

The following tables provide a brief definition of the constant and variable values utilized in the algorithms defined in FIGS. 3 through 13.

| AUTO NEUTRAL CONSTANTS | | | | |
|---|---|---|---|---|
| Calibration Constant | Default Value | Unit | Range | Description |
| ANWSTMIN | 2.048 | seconds | 0–4 seconds | The amount of time in which all automatic neutral at a stop input feature activation requirements must be met, before the feature is activated. |
| CTHRZERO | 14 | % | 0 to 100 | Throttle in percent below or equal which the automatic neutral at a stop input feature is activated. Added to disable AN for drivers applying brake & throttle simultaneously. |
| CANNOMIN | 60 | rpm | 0 to 500 | Transmission output speed below or equal which the automatic neutral at a stop input feature activation is considered. |
| CANNTMIN | 60 | rpm | 0 to 500 | Transmission turbine speed below or equal which the automatic neutral at a stop input feature activation is considered. Added to account for single failure. |
| PC1ANOFF | 50 | psi | 0 to 300 | C1 Initial offgoing pressure |
| CREFMIN | 0 | psi | 0 to 300 | PCREFMIN initialization value. |
| CREFMAX | 60 | psi | 0 to 300 | PCREFMAX initialization value. |
| CADJUPI | 0.5 | — | 5 to 5 | Initial modulated up adjusting factor |
| CANRMPUP | 10 | psi/sec | 0 to 255 | Initial C1 pressure ramp increment for Modulated Up State |
| CSLPPDC | 3 | minor loop | 0 to 2000 | Slip pull down counter (Modulated UpState) |
| CANRAMP1 | 18 | psi/sec | 0 to 255 | C1 pressure ramp decrement (Initial Ramp State) |
| CANRAMP2 | 2 | psi/sec | 0 to 255 | C1 pressure ramp decrement (Initial Ramp State) |
| CSPTUMIN | 400 | rpm | 0 to 1000 | Minimum Turbine Speed before testing turbine |

-continued

AUTO NEUTRAL CONSTANTS

| Calibration Constant | Default Value | Unit | Range | Description |
|---|---|---|---|---|
| | | | | acceleration (Initial Ramp State) |
| CNTMAXAC | 7 | rpm/sec | −5000 to 5000 | Maximum acceptable turbine acceleration when C1 is not slipping |
| CALSLIP | 100 | rpm | −100 to 100 | Minimum Calculated Slip |
| CNTACCNT | 7 | minor loop | 0 to 2000 | Turbine acceleration counter limit to satisfy no Slip condition |
| CTQSLMIN | 13 | rpm | −10 to 10 | Minimum Torque Converter Slip |
| CSLPPD | 10 | rpm | −50 to 50 | Amount of slip speed change to flag pull down (Modulated Up State) |
| CADJDWNI | 1 | — | −5 to 5 | Initial Modulated down pressure adjusting factor |
| CANGPRDS | 0.9 | psi/rpm | 0 to 1 | Proportional Gain for modulated down state |
| NTMAXAC | 21 | rpm/sec | −5000 to 5000 | Acceptable turbine acceleration when C1 is not slipping (Modulated Down State) |
| CSLPPUC | 3 | minor loop | 0 to 2000 | Pull up (no clutch slip) counter |
| CSLPPU | 2 | rpm | −50 to 50 | Amount of slip speed change to flag pull up (no clutch slip) |
| CANRMPDW | 1 | psi/sec | 0 to 255 | C1 pressure ramp decrement (Modulated Down State) |
| IUPADPT | 1 | — | 0 or 1 | Adapting ramp Up pressure adjusting factor, Adapt =1, not adapt = 0 |
| CUPLPUL | 200 | loop | 0 to 20000 | When adapting, desired number of loop to modulate up (upper limit) |
| CUPLPLL | 100 | loop | 0 to 20000 | When adapting, desired number of loop to modulate up (lower limit) |
| CUPDLTA | 0.05 | — | 0 to 1 | "Initial ramp up adjusting factor (ADJUPI)" change per adaptation loop |
| CUPMAX | 1 | — | −5 to 5 | "Initial ramp up adjusting factor(ADJUPI)" max. |
| CUPMIN | 0 | — | −5 to 5 | "Initial ramp up adjusting factor(ADJUPI)" min. |
| CMAXDLTA | 1 | psi | 0 to 255 | PCREFMAX adjustment factor per loop when "initial ramp up adjusting factor(ADJUPI)" reach maximum and desired ramp up period is not achieved. |
| CANSLPTMX | 400 | msec | 0 to 4 sec | Desired closed loop shift time. Slip speed profile is calculated based on VSLIPCL and CANSLPTMX. |
| CANRAMPCL | 10 | psi/sec | 0 to 300 | AN N-1 open loop pressure ramp. Closed loop starts when pull down is detected. |
| CSLPPD | 50 | rpm | 0 to 100 | Change in torque converter slip required to detect pull down for N-1 shift or modulated up state termination |
| CSLIPMIN | 25 | rpm | 0 to 100 | absolute oncoming clutch slip speed threshold to detect sync for AN-1 |
| CKPCL | 0.1 | psi/rpm | 0–1 | Closed loop control proportional gains for ANWS N1-1 shift section (throttle region 0, 1, and 2) |
| PCMAX | 300 | psi | 0–350 | Maximum pressure commanded at end of the shift. |

| Variables | Unit | Range | Description |
|---|---|---|---|
| | AUTO NEUTRAL VARIABLES |||
| ICNVRGNC | — | 0 or 1 | Turbine and engine speed convergence indicator |
| PC1 | psi | 0 to 300 | C1 Clutch Pressure |
| TURBINE SPEED | rpm | 0 to 5000 | Average of last 2 turbine speed measurements |
| ABSOLUTE TURBINE ACCELERATION | rpm/sec | −5000 to 5000 | Absolute Turbine Acceleration |
| TORQUE CONVERTER SLIP | rpm | 0 to 5000 | Slip across torque converter |
| NTACCNT | — | 0 to 2000 | Turbine acceleration counter |
| TQSLIPSUM | rpm | 0 to 1000 | Summation of torque converter slip during convergence |
| TQSLIPAVG | rpm | 0 to 100 | Average of torque converter slip during convergence |
| TQSLPREF | rpm | −100 to 100 | Torque converter slip speed (due to noise) when C1 is not slipping |
| PCUPI | psi | 0 to 300 | Initial pressure for modulated up state |
| PCREFMIN | psi | 0 to 300 | Minimum calculated pressure after initial ramp off or modulated down state |
| IRAMPOFF | — | | Flag to activate/deactivate PC1 Offgoing initial ramp state |
| IMODUP | — | | Flag to activate/deactivate modulated up state |
| IMODDWN | — | | Flag to activate/deactivate modulated down state |
| IUPCNT | — | 0 to 2000 | Loop counter during modulated up state |
| PRAMPUP | psi | 1 to 300 | Ramp pressure during modulated up state |
| PRAMPUPX | psi | 1 to 300 | Previous Ramp pressure during modulated up state |
| PCREFMAX | psi | 0 to 300 | Maximum calculated pressure after initial ramp or modulated up state |
| SLPPDCNT | — | 0 to 2000 | Number of the consecutive loops that pull down has been detected |
| PCDWNI | psi | 0 to 300 | Initital pressure for modulated down state |
| IDWNCNT | — | 0 to 2000 | Loop counter during modulated down state |
| PRAMPDWN | psi | 1 to 300 | Ramp pressure during modulated down state |
| PCLPD | psi | 0 to 300 | Pressure due to proportional controller |
| PCDWADJ | psi | 0 to 300 | Pressure Summation excluding initial value for modulated down state |
| PCDWADJX | psi | 0 to 300 | Previous Pressure Summation excluding initial value for modulated down state |
| SLPPUCNT | — | 0 to 2000 | Number of the loop that pull up has been seen |
| ADJUPI | — | −5 to 5 | Modulated up initial pressure adjusting factor |
| ANRMPUP | psi/loop | 0 to 1 | Adjusted modulated up slope. Adjusted to control modulated up state duration |

-continued

AUTO NEUTRAL VARIABLES

| Variables | Unit | Range | Description |
|---|---|---|---|
| SLPPULUP | — | 0 or 1 | Indicator for termination of modulated down state |
| VSLIPCL | rpm | 0 to 2000 | Slip speed across clutch |
| C1 APPLY INIT | — | | Initialization flag for clutch application control state |
| C1 CLUTCH APPLY | — | | C1 clutch application control state |
| SLIPCMD | rpm | 0 to 2000 | Slip speed command |
| SLIPRATE | rpm/sec | 0 to 4000 | Rate of slip speed command |
| PRAMPCL | psi | 0 to 300 | Clutch ramp pressure |
| PON INIT | psi | 0 to 300 | Initial oncoming pressure for clutch application control state |
| IRAMPUP | — | | Flag to terminate open loop ramp and start closed loop |
| SLIPERROR | rpm | 0 to 2000 | Slip error |
| PKPCL | psi | −100 to 100 | Proportional term during clutch pressure control |
| PTHROTTLE | psi | 0 to 300 | Pressure term as a function of throttle input |

We claim:

1. A power transmission and control for a vehicle:
    said transmission comprising:
        a torque converter having an input speed and an output speed;
        an input shaft drivingly connected with said torque converter;
        an output shaft;
        a planetary gear arrangement disposed between said input shaft and said output shaft comprising a plurality of fluid operated torque transmitting devices, planetary gear means controlled by selective engagement of said torque transmitting devices at predetermined torque capacities to establish a plurality of drive ratios between the input and output shafts including forward, reverse and neutral ratios;
    said control comprising:
        means for determining the drive ratio established;
        means for determining the presence of a zero speed at said input shaft and said output shaft;
        means for determining a presence of an operator demand;
        first means for reducing said torque capacity of one of said torque transmitting devices at a first controlled ramp rate until a first minimum capacity is achieved when said output shaft and said input shaft have a zero speed, a predetermined one of said drive ratios other than neutral is established and an operator demand is present;
        second means for increasing said torque capacity at a first controlled rate until a first predetermined maximum capacity is achieved and said input speed is not zero and said operator demand is present;
        said first means reducing said torque capacity from said first predetermined maximum capacity to a second predetermined minimum capacity;
        said second means increasing said torque capacity until a second predetermined maximum capacity less than said first predetermined is achieved;
        said first means reducing said torque capacity from said second predetermined capacity until at least the second predetermined minimum is achieved; and
        said first and second means maintaining said torque capacity alternately between said second predetermined maximum and minimum capacity when the operator demand is present.

2. The power transmission and control defined in claim 1 wherein the drive ratios include a forward low ratio which is established at a vehicle launch condition; and one of said torque transmitting devices is a fluid operated friction clutch which is engaged to establish the low forward ratio and wherein said friction clutch is said torque transmitting device which is controlled in capacity by said first and second means.

3. The power transmission and control defined in claim 2 further comprising a vehicle brake mechanism and said control having means for determining the operation of said vehicle brake mechanism, and further wherein said brake mechanism must be actuated for said first and second means to be operable.

4. The power transmission and control defined in claim 1 wherein said first means reduces said torque capacity until said input speed is approximately equal to said torque converter input speed, said second means increases said torque capacity until said input speed and said torque converter have a predetermined ratio less than a threshold ratio.

5. A power transmission and control in a vehicle comprising:
    a vehicle brake mechanism an engine fuel control for establishing an engine idle condition;
    an input shaft;
    an output shaft;
    a planetary gear arrangement disposed between said input shaft and said output shaft comprising a plurality of fluid operated torque transmitting devices, planetary gear means controlled by selective engagement of said torque transmitting devices at predetermined torque capacities to establish a plurality of drive ratios between the input and output shafts including a plurality of forward ratios, a reverse ratio and neutral condition;
    ratio control means for determining the drive ratio established;

sensor means for determining the speed of said input shaft and the speed of said output shaft;

first means for reducing said torque capacity of one of said torque transmitting devices to a first predetermined idle minimum capacity when said output shaft and said input shaft have a zero speed, said vehicle brake mechanism is activated, one of said drive ratios controlled in part by said one torque transmitting device is established and said input speed is increased from zero to a first speed value;

second means for increasing said torque capacity at a controlled rate until said input speed decreases from said first speed value and a first predetermined idle maximum capacity is achieved;

third means for increasing said predetermined idle minimum capacity; and said first means being effective to reduce said torque capacity from said first predetermined idle maximum capacity to said increased predetermined idle minimum capacity.

6. The power transmission and control defined in claim 5 and said brake mechanism being deactivated to discontinue said first, second and third means; and means for increasing said torque capacity of said torque transmitting device to a value higher than said first predetermined idle maximum capacity.

7. A method of controlling power transmission in a neutral condition during engine idle, said transmission including; a vehicle brake mechanism, an engine fuel control for establishing an engine idle condition, an engine shaft, an input shaft, an output shaft, a planetary gear arrangement disposed between said input shaft and said output shaft comprising a plurality of fluid operated torque transmitting devices, planetary gear means controlled by selective engagement of said torque transmitting devices at predetermined torque capacities to establish a plurality of drive ratios between the input and output shafts including a plurality of forward ratios, a reverse ratio and neutral condition, ratio control means for determining the drive ratio established, and sensor means for determining the speed of said engine shaft, input shaft and the speed of said output shaft;

said method comprising:
  a) determining the speed of said engine shaft, said input shaft and said output shaft;
  b) determining the drive ratio selected;
  c) determining the slip between the engine shaft and the input shaft;
  d) determine the operating state of the vehicle brakes;
  e) reducing said torque capacity of one of said torque transmitting devices to a first predetermined minimum capacity when said output shaft and said input shaft have a zero speed, said vehicle brake mechanism is activated, one of said drive ratios controlled in part by said one torque transmitting device is established and said input speed is increased from zero to a first speed value and the slip is less than a predetermined value;
  f) repeat steps a) through d);
  g) increasing said torque capacity at a controlled rate until said input speed decreases from said first speed value and a first predetermined idle maximum capacity is achieved;
  h) repeat step e);
  i) increasing said predetermined idle minimum capacity, and reducing said torque capacity from said first predetermined idle maximum capacity to said increased predetermined idle minimum capacity.

8. The method defined in claim 7 further comprising:
  j) reducing said torque capacity to a minimum value below said first minimum capacity when the drive ratio selection is changed.

9. The method defined in claim 7 further comprising:
  k) increasing the torque capacity at a predetermined rate when the vehicle brake is released.

10. The method defined in claim 7 further comprising:
  l) increasing the torque capacity at a predetermined rate when the input speed or the output speed increases more than a predetermined amount.

* * * * *

UNITED STATES PATENT AND TRADEMARK OFFICE
Certificate

Patent No. 5,803,869                                                  Patented: September 8, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of the patent is: Fereydoon Jamazadeh, Indianapolis, IN; Goetz William Schaefer, Brownsburg, IN; Timothy Alan Robinson, Avon, IN.

Signed and Sealed this Sixth Day of March, 2001.

CHARLES A. MARMOR, *Spe*
Art Unit 3681